(12) United States Patent
Taniguchi et al.

(10) Patent No.: US 12,484,119 B2
(45) Date of Patent: Nov. 25, 2025

(54) HEATING COOKER

(71) Applicant: Panasonic Intellectual Property Management Co., Ltd., Osaka (JP)

(72) Inventors: Naoya Taniguchi, Kyoto (JP); Gantetsu Matsui, Kyoto (JP); Kiyoshi Nakashita, Shiga (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 660 days.

(21) Appl. No.: 17/906,974

(22) PCT Filed: Mar. 25, 2021

(86) PCT No.: PCT/JP2021/012472
§ 371 (c)(1),
(2) Date: Sep. 22, 2022

(87) PCT Pub. No.: WO2021/200530
PCT Pub. Date: Oct. 7, 2021

(65) Prior Publication Data
US 2023/0276547 A1    Aug. 31, 2023

(30) Foreign Application Priority Data

Apr. 3, 2020 (JP) ................................. 2020-067179

(51) Int. Cl.
*H05B 6/64* (2006.01)
(52) U.S. Cl.
CPC ......... *H05B 6/6441* (2013.01); *H05B 6/6444* (2013.01)
(58) Field of Classification Search
CPC .... F24C 7/02; F24C 7/08; F24C 7/085; F24C 15/008; H05B 6/6414; H05B 6/6435; H05B 6/6441; H05B 6/6444; H05B 6/6447
See application file for complete search history.

(56) References Cited

U.S. PATENT DOCUMENTS

| | | | |
|---|---|---|---|
| 2017/0223782 A1* | 8/2017 | Imai | H05B 6/6441 |
| 2018/0279425 A1* | 9/2018 | Matsui | H05B 6/6444 |
| 2019/0053336 A1 | 2/2019 | Imai et al. | |

FOREIGN PATENT DOCUMENTS

| | | |
|---|---|---|
| JP | 2001-324146 | 11/2001 |
| JP | 2003-056852 A | 2/2003 |

(Continued)

OTHER PUBLICATIONS

International Search Report of PCT application No. PCT/JP2021/012472 dated May 18, 2021.

(Continued)

*Primary Examiner* — Hung D Nguyen
(74) *Attorney, Agent, or Firm* — Rimon P.C.

(57) ABSTRACT

A heating cooker of the present disclosure includes a heating chamber for accommodating a heating target; a heating unit; a control unit; a detection unit; an illumination unit; an image-capturing unit; a recognition processing unit; and a notification unit. The heating unit heats a heating target. The control unit controls heating by the heating unit. The detection unit detects opening/closing of a door of the heating chamber. The illumination unit illuminates an interior of the heating chamber. The image-capturing unit captures images of the interior of the heating chamber when the door is opened and closed. The recognition processing unit is operable to read the heating control information provided to the heating target from the captured images. When the recognition processing unit successfully reads the heating control information when the door is opened, the control unit causes the notification unit to notify success in reading the heating control information.

9 Claims, 5 Drawing Sheets

(56) References Cited

FOREIGN PATENT DOCUMENTS

| | | |
|---|---|---|
| JP | 2018-082844 A | 5/2018 |
| JP | 3217241 U | 7/2018 |
| JP | 2019-011882 A | 1/2019 |
| WO | 2018/100956 A1 | 6/2018 |
| WO | 2018/235702 A1 | 12/2018 |

OTHER PUBLICATIONS

The EPC Office Action dated Jul. 26, 2023 for the related European Patent Application No. 21779866.9.
English Translation of Chinese Search Report dated Feb. 17, 2025 for the related Chinese Patent Application No. 202180024289.9.

* cited by examiner

| ID | Item | Door opening mode | Door closing mode |
|---|---|---|---|
| A001 | Image-capturing style | Continuous image-capturing | One-shot image-capturing |
| A002 | Light exposure time | 20 ms | 100 ms |
| A003 | Brightness of illumination | 500 Lx | 200 Lx |
| A004 | Gain | ×2 | ×1 |

| ID | Item | Door opening mode | Door closing mode |
|---|---|---|---|
| B001 | Image preprocessing | Without shading correction | With shading correction |

HEATING COOKER

TECHNICAL FIELD

The present disclosure relates to a heating cooker for heating cooking after recognizing characters and codes using a camera positioned inside the heating cooker.

BACKGROUND ART

In a microwave oven as an example of a heating cooker, heating cooking is started when a user inputs heating time or the like and then presses a button for starting heating. In stores selling box lunches, prepared foods, or the like, respectively contained in containers, a store clerk, that is, a user of the heating cooker may provide a food to a customer after heating cooking the food in a microwave oven.

In general, on containers of box lunches and prepared foods, heating time optimum for heating by a microwave oven is described. A user sets the described heating time in a microwave oven by using numeric keys or the like on an operation unit so as to start to heat a heating target.

A microwave oven may have a plurality of operation buttons to which different heating times are assigned. In this case, when a user presses an operation button to which the heating time corresponding to a heating target is assigned, the heating target can be optimally heated.

However, in such a microwave oven, it is necessary to especially input heating time, or the like, which is troublesome for a user.

Therefore, technologies of automatically setting heating time in a microwave oven have been proposed. Patent Literature 1 discloses a heating cooker equipped with a camera. The heating cooker disclosed in Patent Literature 1 appropriately heats a heating target by image-capturing the heating target by a camera and recognizing the captured images before cooking.

Patent Literature 2 discloses a heating cooker equipped with a scanning device such as a bar code reader. In the heating cooker disclosed in Patent Literature 2, heating is started without pressing an operation button when a heating target is held over the scanning device, and then accommodated in the heating chamber, and the door is closed.

CITATION LIST

Patent Literature

PTL 1: Japanese Patent Application Unexamined Publication No. 2001-324146
PTL 2: Japanese Utility Model Registration No. 3217241

SUMMARY OF THE INVENTION

However, in the conventional technologies, heating control information provided to a heating target is read in any one of a state of opening a door of a heating cooker and a state of closing the door of the heating cooker. This does not mean that in the conventional technologies, the heating control information can be recognized regardless of opening/closing of the door.

The present disclosure has an object to provide a heating cooker capable of recognizing heating control information of a heating target regardless of whether the door is opened or closed, and easily carrying out heating cooking.

A heating cooker according to one aspect of the present disclosure includes a heating chamber for accommodating a heating target, a heating unit, a control unit, a detection unit, an illumination unit, an image-capturing unit, a recognition processing unit, and a notification unit.

The heating unit heats a heating target accommodated in the heating chamber. The control unit controls the heating unit. The detection unit detects opening/closing of a door of the heating chamber. The illumination unit illuminates an interior of the heating chamber. The image-capturing unit is operable to capture images of an interior of the heating chamber. The recognition processing unit is operable to read the heating control information provided to the heating target from the images captured by the image-capturing unit. The notification unit notifies a user of information.

The image-capturing unit captures the images when the door is opened and when the door is closed; the recognition processing unit is operable to read the heating control information provided to the heating target from the captured images; when the recognition processing unit successfully reads the heating control information when the door is opened, the control unit causes the notification unit to notify success in reading the heating control information.

According to the above-mentioned configuration, during a series of operations from an operation of accommodating the heating target in the heating chamber to an operation of closing the door, the heating control information can be read. As a result, heating cooking can be carried out simply and quickly.

DESCRIPTION OF EMBODIMENTS

A heating cooker in accordance with a first aspect of the present disclosure includes a heating chamber for accommodating a heating target, a heating unit, a control unit, a detection unit, an illumination unit, an image-capturing unit, a recognition processing unit, and a notification unit.

The heating unit heats a heating target accommodated in the heating chamber. The control unit controls the heating unit. The detection unit detects opening/closing of a door of the heating chamber. The illumination unit illuminates an interior of the heating chamber. The image-capturing unit is operable to capture images of an interior of the heating chamber. The recognition processing unit is operable to read the heating control information provided to the heating target from the images captured by the image-capturing unit. The notification unit notifies a user of information.

The image-capturing unit captures the images when the door is opened and when the door is closed; the recognition processing unit is operable to read the heating control information provided to the heating target from the captured images; when the recognition processing unit successfully reads the heating control information when the door is opened, the control unit causes the notification unit to notify success in reading the heating control information.

In a heating cooker according to a second aspect of the present disclosure, in addition to the first aspect, when the recognition processing unit cannot read the heating control information when the door is opened, and can read the heating control information when the door is closed, the control unit causes the notification unit to notify success in reading the heating control information.

In a heating cooker according to a third aspect of the present disclosure, in addition to the first and second aspects, when the recognition processing unit cannot read the heating control information both when the door is opened and when the door is closed, the control unit causes the notification unit to notify failure in reading the heating control information.

In a fourth heating cooker of the present disclosure, in addition to any one of the first to third aspects, a mode of reading the heating control information when the door is opened and a mode of reading the heating control information when the door is closed have different image-capturing conditions.

In a fifth heating cooker of the present disclosure, in addition to the fourth aspect, the number of times of image-capturing by the image-capturing unit is larger in the mode of reading the heating control information when the door is opened than in the mode of reading the heating control information when the door is closed.

In a sixth heating cooker of the present disclosure, in addition to the fourth or fifth aspect, light exposure time of the image-capturing unit is shorter in the mode of reading the heating control information when the door is opened than in the mode of reading the heating control information when the door is closed.

In a seventh heating cooker of the present disclosure, in addition to the fourth to sixth aspects, illumination by the illumination unit is brighter in the mode of reading the heating control information when the door is opened than in the mode of reading the heating control information when the door is closed.

Hereinafter, an exemplary embodiment of the present disclosure is described with reference to drawings.

Figure 1:
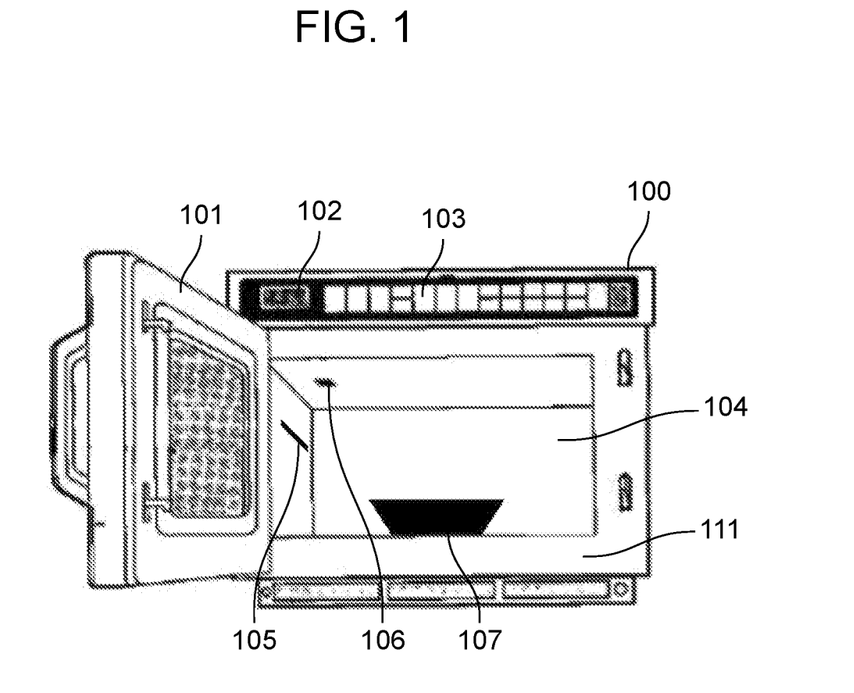
FIG. 1 is a view showing an external appearance of a heating cooker in accordance with one exemplary embodiment of the present disclosure.

FIG. 1 is a view showing an external appearance of heating cooker 100 in accordance with this exemplary embodiment. As shown in FIG. 1, heating cooker 100 is a microwave oven including housing 111 having heating chamber 104 inside thereof. Heating chamber 104 accommodates food 107 as a heating target. Housing 111 includes door 101 positioned on its front for covering an opening at the front of heating chamber 104, and display part 102 and selection part 103 which are positioned at the upper side of door 101.

Heating cooker 100, as mentioned later, reads heating time corresponding to food 107 from the description on the label provided to food 107, and heats and cooks food 107 depending on the heating time. On display part 102, heating control information such as the heating time is displayed. The heating control information may include heating power (wattage).

Selection unit 103 includes a menu selection button for selecting a cooking menu corresponding to food 107, a numeric button for manually setting the heating time, and a "minute" button and a "second" button for setting a clock, used in the case where the heating time is not read. Selection unit 103 further includes a start button for starting heating and a stop button (pause/cancel) for stopping heating. Selection unit 103 allows a user to input various settings including the above-mentioned settings.

Heating chamber 104 includes LED (light emitting diode) lamp 105 and camera 106. LED lamp 105 is disposed on the upper part of the side surface of heating chamber 104. Camera 106 is arranged closer to the side surface than the center of the ceiling of heating chamber 104. With this configuration, images of the whole interior of heating chamber 104 can be captured. Camera 106 may be positioned on the side surface.

In heating cooker 100, camera 106 captures images of food 107 accommodated in heating chamber 104, and heating control information related to food 107 is detected from the captured image information.

LED lamp 105 illuminates the whole interior of heating chamber 104 from the side surface of heating chamber 104. LED lamp 105 may be disposed on the ceiling of heating chamber 104.

Figure 2:
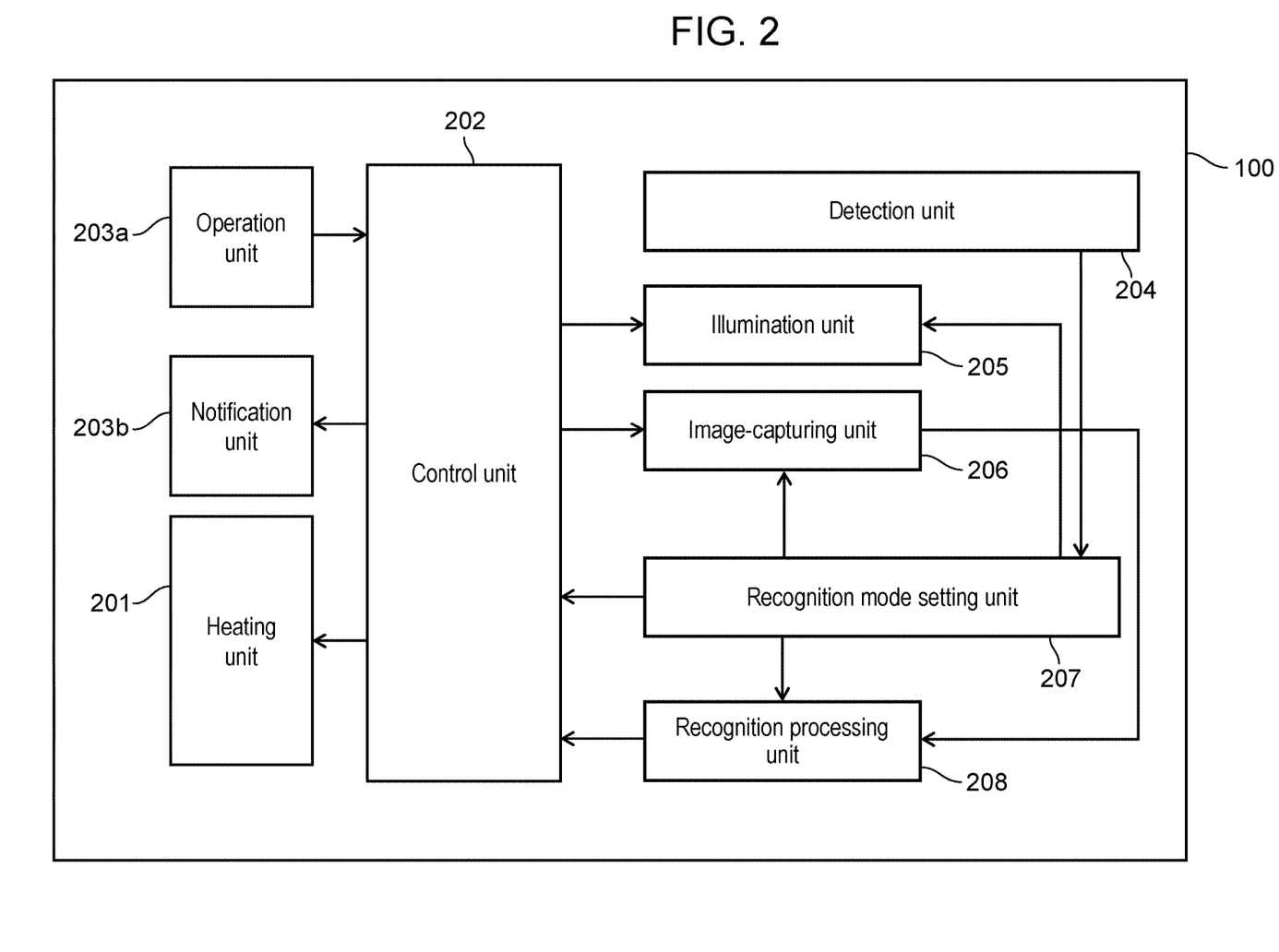
FIG. 2 is a block diagram schematically showing a functional configuration of the heating cooker in accordance with one exemplary embodiment.

FIG. 2 is a block diagram schematically showing a functional configuration of heating cooker 100.

As shown in FIG. 2, heating cooker 100 includes heating unit 201, control unit 202, operation unit 203a, notification unit 203b, detection unit 204, illumination unit 205, image-capturing unit 206, recognition mode setting unit 207, and recognition processing unit 208.

Heating unit 201 heats food 107 accommodated in heating chamber 104. Control unit 202 controls heating of food 107 by controlling heating unit 201. Operation unit 203a is used for various operations and settings by a user.

Detection unit 204 detects opening/closing of door 101. Illumination unit 205 illuminates an interior of heating chamber 104. Image-capturing unit 206 includes camera 106 (see FIG. 1), and captures an image of the interior of heating chamber 104. Recognition mode setting unit 207 determines the setting conditions of image-capturing unit 206 and illumination unit 205 depending on opening/closing of door 101. Recognition processing unit 208 performs image recognition processing with respect to the image captured by image-capturing unit 206, and informs control unit 202 of the result.

Heating part 201 includes, for example, a magnetron or a semiconductor oscillator and a radiation type heater, and heats food 107 placed in heating chamber 104.

Control unit 202 includes a microcomputer, a microprocessor, or the like, and controls heating unit 201 based on the interior state of heating chamber 104 and heating control information related to food 107. The heating control information includes heating power and heating time corresponding to the heating power.

Operation unit 203a has a plurality of keys including, for example, a touch panel and mechanical buttons. A user uses operation unit 203a to carry out settings of the menu and heating time, start of heating, and pause of heating.

Notification unit 203b includes, for example, a display device such as an LED display or a liquid crystal display, and displays the elapsed heating time, remaining heating time, heating power, and the like. Notification part 203b further performs an error display and recognition display if any failure occurs. The recognition display includes display of the setting contents by a user and display indicating that the recognition by image-capturing unit 206 is successful. Informing unit 203a informs a user of information by such displays.

In addition to the display device, notification unit 203b may further include a loudspeaker for performing notification by some sound.

Detection unit 204 includes an openable/closable door switch, and the like, and detects whether door 101 is opened or closed. Detection unit 204 notifies recognition mode setting unit 207 of the detected information.

Image-capturing unit 206 includes, for example, a CMOS (complementary metal oxide semiconductor) image sensor, a CCD (charge coupled device) image sensor, or the like, and captures images of the interior of heating chamber 104. Image-capturing unit 206 includes camera 106 described above and a control circuit.

Illumination unit 205 includes LED lamp 105 and illuminates the interior of heating chamber 104 with brightness between 0% and 100%.

Recognition mode setting unit 207 sets image-capturing conditions of image-capturing unit 206 and the brightness of illumination unit 205 depending on the open/closed state of door 101, and informs control unit 202 of completion of setting. Control unit 202 starts operations of image-capturing unit 206 and illumination unit 205 by a recognition mode set by recognition mode setting unit 207.

Recognition processing unit 208 analyzes and recognizes whether an image captured by image-capturing unit 206 is character information or code information (information related to control including numbers).

Recognition processing unit 208 performs recognition processing of the heating control information described on, for example, a label attached to food 107. The heating control information includes, for example, a combination of heating power and heating time such as "at 900 W for 2 minutes and 30 seconds". Furthermore, recognition processing unit 208 performs correction processing of the image captured by image-capturing unit 206.

Recognition mode setting unit 207 and recognition processing unit 208 include a microcomputer or a microprocessor. These elements may be formed integrally with control unit 202 or may be formed separately.

A character recognition method of the label may be, for example, a method for detecting heating control information surrounded by a frame in the label, or a method for detecting the contour of the label. The character information may include not only heating control information but also information related to image information, type, shape, and shelf life of foods. The method for recognizing the code information may be a method for recognizing a general bar code or a QR code (registered trademark).

Figure 3A:
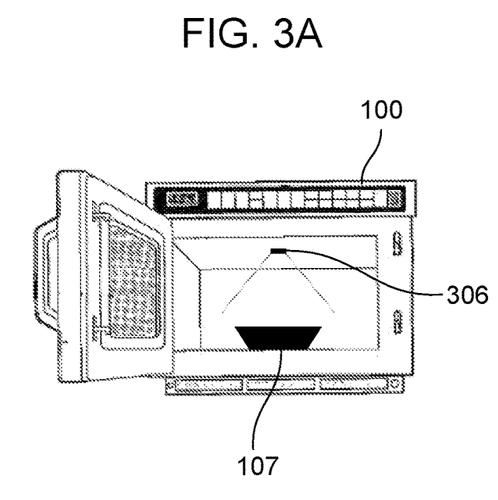
FIG. 3A is a view schematically showing a state in which heating control information is recognized with a door open.
Figure 3B:
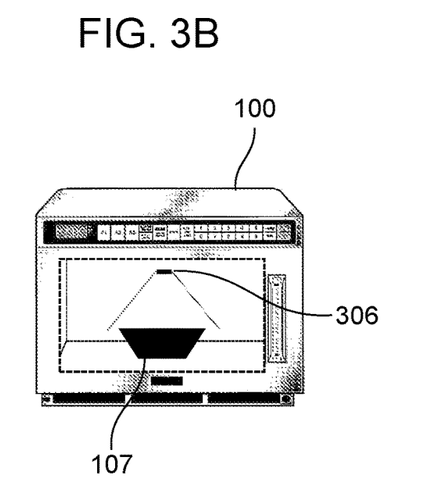
FIG. 3B is a view schematically showing a state in which heating control information is recognized with a door closed.

FIG. 3A is a view schematically showing a state in which heating control information is recognized with door 101 open. FIG. 3B is a view schematically showing a state in which heating control information is recognized with door 101 closed.

In the example shown in FIG. 3A, camera 306 captures an image of food 107 with door 101 open, recognition processing unit 208 recognizes the heating control information attached to food 107. Food 107 is a box lunch, and camera 306 is positioned in the center of the ceiling of heating chamber 104.

In an example shown in FIG. 3A, the heating control information is recognized after food 107 is placed in heating chamber 104. However, a user may bring food 107 closer to camera 306 to allow heating cooker 100 to recognize the heating control information, or heating cooker 100 may recognize the heating control information in a series of operations from the time when a user opens door 101 until places food 107 in heating chamber 104.

In the example shown in FIG. 3B, camera 306 captures an image of food 107 with door 101 closed, and recognition processing unit 208 recognizes the heating control information attached to food 107.

Figure 4:
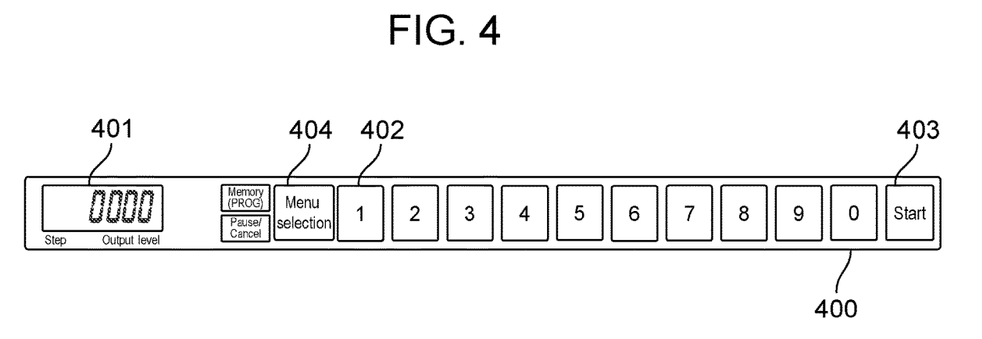
FIG. 4 is a view showing an operation display panel of a heating cooker in accordance with one exemplary embodiment.

FIG. 4 is a view showing operation display panel 400 of heating cooker 100. Operation display panel 400 shown in FIG. 4 is one example of display part 102 and selection part 103. Operation display panel 400 includes LED display 401, menu selection button 404, numeric buttons 402, and start button 403. Display part 102 (LED display 401) is a part of notification unit 203b.

LED display 401 is used for displaying heating control information. Menu selection button 404 and numeric buttons 402 are buttons for various cooking menu settings and special operations. Start button 403 is a button for starting heating processing determined by recognition processing unit 208.

In heating cooker 100, LED display 401 displays for performing various operations. Therefore, for most setting operations, it is necessary to press numeric buttons 402, start button 403, and the like, many times. Such operations are burdensome and troublesome for a user.

If the heating control information provided to food 107 can be read automatically, heating of food 107 can be started by simply pressing start button 403. As a result, a user can avoid troublesome setting.

Figure 5:
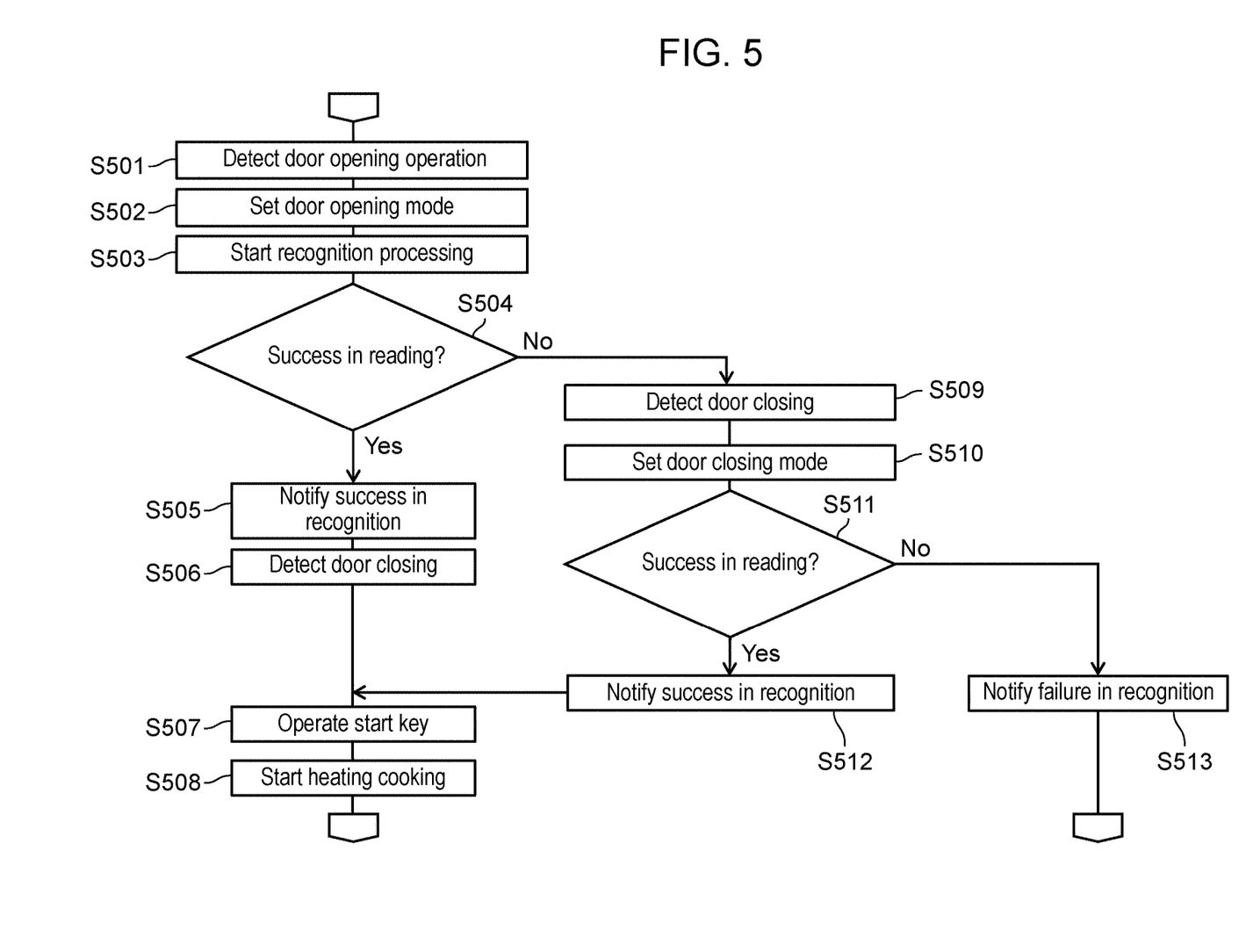
FIG. 5 is a flow chart showing a flow of recognition processing in the heating cooker in accordance with one exemplary embodiment.

FIG. 5 is a flow chart showing a flow of the image recognition processing in heating cooker 100.

As shown in FIG. 5, detection unit 204 detects an opening operation of door 101 by a user based on the state of a door switch (step S 501). The processing remains in step S501 until door 101 is opened. When door 101 is opened, the processing proceeds to step S502.

Recognition mode setting unit 207 sets the recognition mode to a door opening mode (step S502). Image-capturing unit 206 captures an image of the inside of heating chamber 104, and recognition processing unit 208 carries out recognition processing of the heating control information based on the captured image (step S503).

Figure 6:
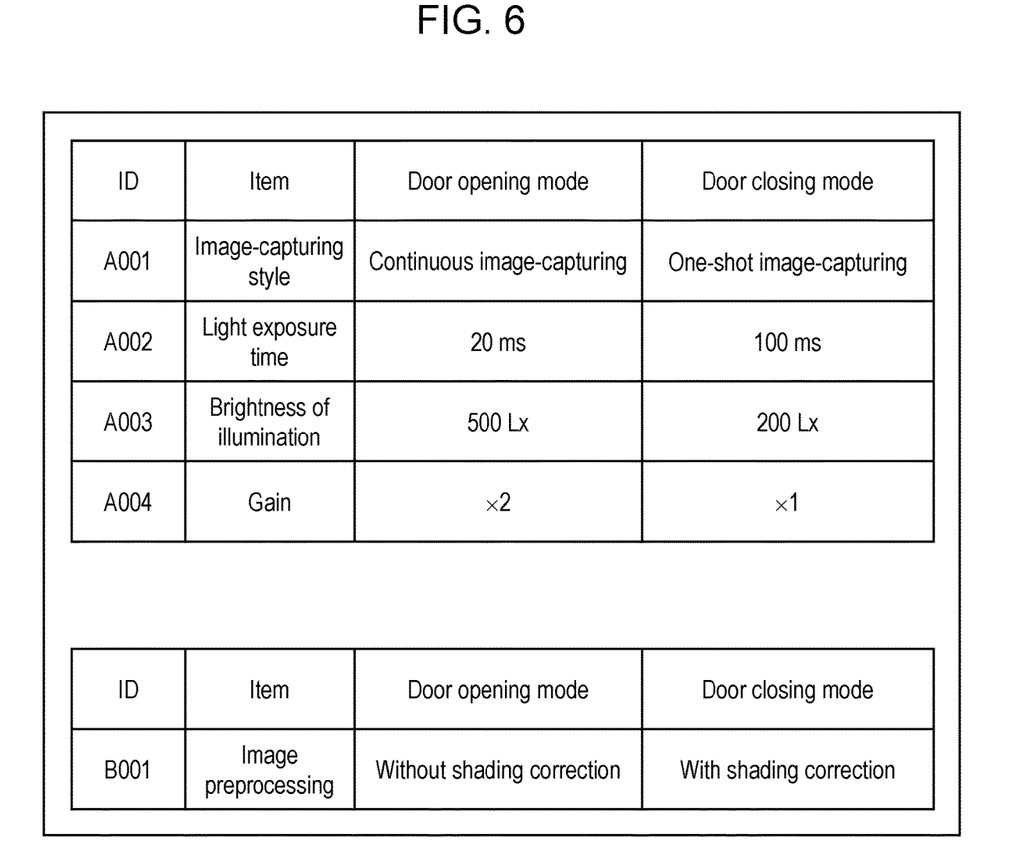
FIG. 6 is a view showing conditions and numerical values to be set in each item in a door opening mode and a door closing mode.

FIG. 6 is a view showing conditions and numerical values to be set in each item in the door opening mode and the door closing mode.

As shown in FIG. 6, in the door opening mode, an image-capturing style of image-capturing unit 206 is set to "continuous image-capturing" (see ID "A001" in FIG. 6). Light exposure time of image-capturing unit 206 is set to, for example, 20 ms (see ID "A002" in FIG. 6). Brightness of illumination unit 205 is set to, for example, 500 lux (Lx) (see ID "A003" in FIG. 6). A gain of image-capturing unit 206 is set to ×2 (for example, 6 dB) (see ID "A004" in FIG. 6).

In the door opening mode, image-capturing unit 206 performs image-capturing continuously in a short time. Specifically, after a user inserts food 107 into heating chamber 104 and places it in heating chamber 104, image-capturing is performed repeatedly until door 101 is closed. Every time image-capturing is performed, the recognition processing is performed. That is to say, in the door opening mode, image-capturing is carried out as many times as possible so that the heating control information attached to food 107 can be recognized as soon as possible.

The number of times of image-capturing is larger, the light exposure time is shorter, the illumination is brighter, and the gain is set higher in the door opening mode than in the door closing mode. Thus, the heating control information attached to food 107 can be recognized as soon as possible.

In the door opening mode, recognition processing unit 208 does not perform shading correction in image preprocessing (see ID "B001" in FIG. 6). The shading correction is processing of removing concentration unevenness from an image having concentration unevenness.

Returning to FIG. 5, in the door opening mode, recognition processing unit 208 succeeds in reading the heating control information (Yes in step S504), the heating control information to be set for heating is determined. The processing proceeds to step S505. Control unit 202 notifies a user of the success in reading the heating control information by notification unit 203b (step S505).

Control unit 202 may cause notification unit 203b to display, for example, "recognition success". Control unit 202 may cause notification unit 203b to make, for example, a "beep" sound once. In this way, a user can recognize, by display or sound, that heating cooker 100 is in a heatable state by recognizing the heating control information.

When a user closes door 101, detection unit 204 detects closing of door 101 (step S506). Thereafter, a user presses start button 403 (step S507). Thus, the user can start heating cooking of food 107 without setting heating time, heating power, and the like, by operation unit 203a (step S508).

In the door opening mode, after detection unit 204 detects the closing of door 101 (step S506), recognition processing unit 208 may notify a user of success in reading the heating control information (step S505). That is to say, the order of step S505 and step S506 may be reversed.

In the door opening mode, if recognition processing unit 208 fails to read the heating control information until a user closes door 101 (No in step S504), the processing proceeds to step S509.

After a user closes door 101 and detection unit 204 detects the closing of the door (step S 509), recognition mode setting unit 207 sets the recognition mode to the door closing mode (step S510). Image-capturing unit 206 images the inside of heating chamber 104, and recognition processing unit 208 performs recognition processing of the heating control information based on the captured image.

As shown in FIG. 6, in the door closing mode, the image-capturing style of image-capturing unit 206 is set to "one-shot image-capturing" (see ID "A001" in FIG. 6). The light exposure time of image-capturing unit 206 is selected to be set, for example, 100 ms (see ID "A002" in FIG. 6). The brightness of illumination unit 205 is set to, for example, 200 Lx (see ID "A003" in FIG. 6). The gain of image-capturing unit 206 is set to ×1 (for example, 3 dB) (see ID "A004" in FIG. 6).

In the door closing mode, an image of food 107 placed in heating chamber 104 is captured in a "one-shot image-capturing" style with longer light exposure time than in the door opening mode. Thus, the heating control information attached to food 107 can be recognized more reliably.

The number of times of image-capturing is smaller, the light exposure time is longer, the illumination is darker, and the gain is set lower in the door closing mode than in the door opening mode.

Both in the door opening mode and in the door closing mode, it is desirable that the numerical values of "light exposure time×brightness of illumination×gain" are the same. In this exemplary embodiment, the value is 20,000 (see FIG. 6).

In the door closing mode, recognition processing unit 208 performs shading correction as the image preprocessing (see ID "B001" in FIG. 6).

Returning to FIG. 5, when recognition processing unit 208 succeeds in reading the heating control information in the door closing mode (Yes in step S511), the heating control information to be set for heating is determined. The processing proceeds to step S512. Control unit 202 notifies a user of the success in reading the heating control information by notification unit 203b (step S512).

Control unit 202 may cause notification unit 203b to display, for example, "recognition success," "OK," and the like. Control unit 202 may cause notification unit 203b to make, for example, a beep sound once.

In this way, a user can recognize, by display or sound, that heating cooker 100 is in a heatable state by recognizing the heating control information. When a user presses button 403 (step S507), the user can start heating cooking of food 107 without setting heating time, heating power, and the like, by operation unit 203a (step S508).

In the door closing mode, when recognition processing unit 208 fails to read the heating control information (No in step S511), the processing proceeds to step S513. Control unit 202 notifies a user of failure in reading the heating control information by notification unit 203b (step S513). In this case, the heating control information to be set for heating is not determined.

Control unit 202 may cause notification unit 203b to display, for example, "recognition failure", "NG", and the like. Control unit 202 may cause notification unit 203b to make a sound such as "pip-pip" three times. Control unit 202 may cause notification unit 203b to notify "Recognition error occurs" by sound.

A user can recognize by display or sound that heating cooker 100 cannot recognize the heating control information that heating cooker 100 is not in a heatable state. The user can perform reading the heating control information again by opening door 101 again, taking food 107 out, recognizing the label attached to food 107 again, and inserting food 107 into heating chamber 104 again.

When heating cooker 100 incorporates a memory for storing captured images, images which have been successfully read and images which have not been read can be stored both in the door opening mode and in the door closing mode.

Controller 202 can also analyze a cause of a read error by reading and analyzing the stored images. An external storage medium such as an SD card or a USB (universal serial bus) memory may be used instead of the incorporated memory.

As mentioned above, according to this exemplary embodiment, when door 101 is opened and door 101 is closed, the heating control information provided to food 107 can be read. When heating control information cannot be read when door 101 is opened, heating cooker 100 notifies a use of success in reading the heating control information.

Thus, a user need not perform troublesome operations such as bringing characters or codes related to heating control information closer to an image-capturing unit. The heating control information can be read during a series of operations in which the user stores food 107 in the heating chamber and closes the door. As a result, rapid cooking becomes possible.

When heating cooker 100 cannot read the heating control information when door 101 is opened, and can read the heating control information when door 101 is closed, heating cooker 100 notifies a user of success in reading the heating control information. The heating control information that has not been read when door 101 is opened can be read more reliably and accurately when the door 101 is closed.

Thus, a user need not perform troublesome operations such as bringing characters or codes related to heating control information closer to an image-capturing unit. The heating control information can be read during a series of operations in which the user stores food 107 in the heating chamber and closes the door. As a result, rapid cooking becomes possible.

When heating control information cannot be read when door 101 is opened and when door 101 is closed, heating cooker 100 notifies a user of a failure in reading the heating control information. This can urge a user to open door 101 again, take food 107 out, check the label attached to food 107 again, and insert the food again. As a result, reading the heating control information can be carried out more reliably.

In this exemplary embodiment, as shown below, the door opening mode in which heating control information is read when door 101 is opened and the door closing mode in which heating control information is read when door 101 is closed have different image-capturing conditions. Thus, heating control information can be read more reliably in any one of the time when door 101 is opened and the time when door 101 is closed.

The number of times of image-capturing by image-capturing unit 206 can be set to be larger in the door opening mode in which heating control information is read when door 101 is opened than in the door closing mode in which heating control information is read when door 101 is closed. Thus, heating control information can be read more reliably in any one of the time when door 101 is opened and the time when door 101 is closed.

Light exposure time of image-capturing unit 206 is set shorter in the door opening mode in which heating control information is read when door 101 is opened than in the door closing mode in which heating control information of food 107 is read when door 101 is closed. Thus, heating control information can be read more reliably in any one of the time when door 101 is opened and the time when door 101 is closed.

Illumination by illumination unit 205 is set brighter in the door opening mode in which heating control information is read when door 101 is opened than in the door closing mode in which heating control information of food 107 is read when door 101 is closed. Thus, the heating control information can be read more reliably in any one of the time when door 101 is opened and the time when door 101 is closed.

INDUSTRIAL APPLICABILITY

The present disclosure can be applied to a heating cooker such as a microwave oven.

REFERENCE MARKS IN THE DRAWINGS

100 heating cooker
101 door
102 display part
103 selection part
104 heating chamber
105 LED lamp
106, 306 camera
107 food
201 heating unit
202 control unit
203*a* operation unit
203*b* notification unit
204 detection unit
205 illumination unit
206 image-capturing unit
207 recognition mode setting unit
208 recognition processing unit
400 operation display panel
401 LED display
402 numeric button
403 start button
404 menu selection button

The invention claimed is:

1. A heating cooker comprising:
    a heating chamber configured to accommodate a heating target;
    a heating unit configured to heat the heating target accommodated in the heating chamber;
    a control unit configured to control the heating unit;
    a detection unit configured to detect opening and closing of a door of the heating chamber;
    an illumination unit configured to illuminate an interior of the heating chamber;
    an image-capturing unit configured to capture an image of the interior of the heating chamber; and
    a recognition processing unit configured to read heating control information provided to the heating target from the image captured by the image-capturing unit,
    wherein the image-capturing unit is configured to capture the image when the door is opened and when the door is closed;
    the recognition processing unit is configured to obtain the heating control information provided to the heating target from the captured image,
    when the recognition processing unit fails to read the heating control information while the door is opened, the image-capturing unit is configured to perform imaging-capturing when the door is closed.

2. The heating cooker according to claim 1, further comprising:
    a notification unit configured to notify a user of information,
    wherein when the recognition processing unit successfully reads the heating control information when the door is closed, the control unit is configured to cause the notification unit to notify success in reading the heating control information.

3. The heating cooker according to claim 1, further comprising:
    a notification unit configured to notify a user of information,
    wherein when the recognition processing unit fails to read the heating control information when the door is opened and when the door is closed, the control unit is configured to cause the notification unit to notify failure in reading the heating control information.

4. The heating cooker according to claim 1, wherein a recognition mode of reading the heating control information when the door is opened and a recognition mode of reading the heating control information when the door is closed have different image-capturing conditions.

5. The heating cooker according to claim 4, wherein number of times of image-capturing by the image-capturing unit in the recognition mode of reading the heating control information when the door is opened is larger than in the recognition mode of reading the heating control information when the door is closed.

6. The heating cooker according to claim 4, wherein light exposure time of the image-capturing unit is shorter in the recognition mode of reading the heating control information when the door is opened than in the recognition mode of reading the heating control information when the door is closed.

7. The heating cooker according to claim 4, wherein illumination by the illumination unit is brighter in the recognition mode of reading the heating control information when the door is opened than in the recognition mode of reading the heating control information when the door is closed.

8. The heating cooker according to claim 1, wherein the image-capturing unit is configured to perform one-shot imaging-capturing when the door is closed.

9. The heating cooker according to claim 1, further comprising:
   a notification unit configured to notify a user of information,
   wherein when the recognition processing unit successfully reads the heating control information when the door is opened, the control unit is configured to cause the notification unit to notify success in reading the heating control information.

\* \* \* \* \*